United States Patent
Hendricks et al.

(10) Patent No.: US 6,674,856 B1
(45) Date of Patent: Jan. 6, 2004

(54) PLACEMENT OF A TRANSMIT PREDISTORTION FILTER WITH RESPECT TO A DATA ACCESS ARRANGEMENT

(75) Inventors: Paul D. Hendricks, Coopersburg, PA (US); Donald R. Laturell, Allentown, PA (US); Lane A. Smith, Easton, PA (US); Steven B. Witmer, Spring Township, Berks County, PA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/401,995

(22) Filed: Sep. 23, 1999

(51) Int. Cl.[7] .............................. H04M 1/00; H04M 9/00
(52) U.S. Cl. .............................. 379/399.01; 379/93.05; 379/402; 375/254; 375/285; 375/296
(58) Field of Search .................... 379/93.01, 93.05, 379/93.06, 406.12, 387.01, 388.06, 390.02, 390.04, 391, 394, 399.01, 402, 404, 413.02; 375/243, 244, 254, 275, 284, 285, 295, 296

(56) References Cited

U.S. PATENT DOCUMENTS

| | | | | |
|---|---|---|---|---|
| 4,862,449 A | * | 8/1989 | Hoefkens et al. | 370/32.1 |
| 4,943,980 A | * | 7/1990 | Dobson et al. | 375/42 |
| 5,128,964 A | * | 7/1992 | Mallory | 379/39 |
| 5,910,978 A | * | 6/1999 | Maytal et al. | 379/93.01 |
| 6,404,780 B1 | * | 6/2002 | Laturell et al. | 370/510 |

\* cited by examiner

Primary Examiner—Binh Tieu
(74) Attorney, Agent, or Firm—William H. Bollman

(57) ABSTRACT

The present invention provides a digital pre-distortion filter in arrangement with a data access arrangement (DAA) on the component side (e.g., in a modem chipset). This arrangement of the pre-distortion filter outside of the DAA allows digital processes such as digital emulation of the central office impedance to remain unaffected by the pre-distortion in the transmitted signal, allowing the dynamic range of the transmitted signal to be flattened to minimize return loss without complicating the transfer function of the digital emulation of the central office complex load. In the case of a digital emulation filter, placement of a digital pre-distortion filter outside of an analog-to-digital (A/D) digital-to-analog (D/A) loop also minimizes the noise otherwise associated with the use of a pre-distortion filter. Thus, benefits of a pre-distortion filter can be gained without interfering with emulation of impedance, and without causing a significant amount of noise in the transmitted signal.

20 Claims, 4 Drawing Sheets

WITH EQUALIZATION

PLACEMENT OF A TRANSMIT PREDISTORTION FILTER WITH RESPECT TO A DATA ACCESS ARRANGEMENT

BACKGROUND OF THE INVENTION

1. Field of the Invention

This invention relates generally to data access arrangements (DAAs). More particularly, it relates to an architecture for a data access arrangement which provides a flat transmit signal into a complex load over all frequencies of interest.

2. Background of Related Art

A data access arrangement (DAA) typically provides a complete telephone line interface to North American and International Public Switched Telephone Networks (PSTNs). A typical modem solution, for instance, comprises a DAA to interface to the telephone line, a modem chipset, and support components such as a host processor.

DAAs vary in complexity. For instance, some DAAs may include ring detect circuitry, a line transformer, and relay functions. Other functions such as a 2- to 4-wire hybrid, Caller ID, handset interrupt, and connect detect may be included in other models of DAAs. International models may also be available which contain special features required by the telecommunications regulations of various countries.

In a digital device such as a modem (e.g., a 56K modem), a DAA is used to provide a barrier between a modem chip set and a telephone line. Included in a conventional DAA for this application are transformers to provide isolation and balance while minimizing signal distortion within communications networks. Located close to the phone jack, the transformers function as an isolation barrier to high voltages which may be present on a telephone line. While minimizing signal distortion, electrical aspects of a DAA and associated telephone line nevertheless inevitably cause some level of frequency response distortion in a transmitted signal, most typically either because of an impedance mismatch With a central office, and/or because of a complex impedance at the central office.

DAA transmit circuitry may follow Norton or Thevenin equivalence rules. However, if Norton equivalency is used (e.g., a current source transmitter as opposed to a voltage source transmitter), the image match circuit causes additional frequency response distortion not present with a Thevenin type (e.g., a voltage source) transmitter.

Maintaining a flat transmit response is important to high-speed applications, particularly in high speed modem applications such as a 56 kbits/s modem. Minimizing transmit frequency response distortion levels is a requirement of such high-speed applications because transmit frequency response distortion tends to slow data rates. Thus, the lower the frequency response distortion, the better the possibility of increasing the data rate of the device.

In particular, when transmitting a signal from a component such as a modem to a telephone line through a DAA, the goal is to have a flat transmit signal at all frequencies. In the United States this is easy to accomplish because the central office termination is typically required to be 600 ohms, which has a flat frequency response. Because of this simple impedance, a pre-distortion filter can be implemented with analog components, e.g., in a Hybrid device. Moreover, analog pre-distortion filters can be used in analog interfaces to compensate for the effects of frequency distortion experienced by a transmitted signal in a country where the central office presents a complex load to a device connected to a telephone line.

Ideally, a pre-distortion filter pre-distorts a transmitted signal before it is transmitted in a way which is opposite to the effects of the frequency distortion which it will experience so that the resulting signal after transmission will match that before transmission.

If the impedance is matched between the modem device and the central office, return loss will be minimized and pre-distortion is relatively simple. Thus, if the DAA of the modem device presents a load (even a complex load) to a telephone line which is identical to the load at the central office, the signal received back from the telephone line will have a flat frequency response (i.e., will not be frequency distorted) with a 6 decibel (dB) loss. This is a minimized return loss.

Unfortunately, digital circuit advances are limited by the conventional analog pre-distortion architectures. One such advance is digital emulation of a complex load of a central office, as devised by the present inventors.

In particular, the inventors have developed an architecture for emulating a complex central office load, entitled IMPEDANCE MATCHING WITH SIGMA DELTA FILTER, filed on Aug. 24, 1999 and having common inventorship with the inventorship of the present application as of its filing, the contents of which are expressly incorporated herein in their entirety.

When emulating a central office load in accordance with the inventors' impedance emulation concepts disclosed in a previous patent application, all elements of the transmit transfer function fall out but for the central office load. As a result, any transmitted signal will take on the shape of the complex load of the central office. Thus, even if the frequency of the originally transmitted signal is flat, signals passed over the current driven lines will nevertheless be frequency distorted by taking on the shape of the complex load of the central office when transmitted over the telephone line. This can result in a dynamic range of as high as 12 dB.

Thus, complex loads are typically accommodated with an analog pre-distortion filter in a hybrid. However, in digital systems which emulate a load in a DAA, pre-distortion of a transmitted signal would interfere significantly with (or change significantly) the value of the emulated load in the DAA, degrading the benefits of the pre-distortion and making the impedance emulation difficult if at all possible. Moreover, besides the degrading effects caused by a pre-distortion filter on digital processing such as emulation of a complex load, the analog components of a conventional pre-distortion filter and switching mechanisms in a hybrid necessary to accommodate any of a variety of country's complex loads add to the cost of the DAA.

This equalization must be independent of "pre-emphasis" algorithms that exist in a high speed modem transmit signal path such as a V.90 transmit algorithm. The equalization process defined in this disclosure is specifically used to remove the frequency response distortion that occurs with a current source transmitter.

There is thus a need to provide a DAA architecture which allows flattening of the frequency response of a transmit signal by pre-distortion even when emulating a complex load of a central office.

SUMMARY OF THE INVENTION

In accordance with the principles of the present invention, an interface for connection to a telephone line comprises a data access arrangement adapted for connection to a central office. A digital pre-distortion filter is in a transmit path in communication with a modem side of the data access arrangement.

A method of flattening a dynamic range of a transmit signal through a data access arrangement in accordance with another aspect of the present invention comprises pre-distorting a transmit signal. The pre-distorted transmit signal is presented to a data access arrangement. The pre-distorted transmit signal is transmitted to a central office together with a signal representing an emulated impedance of a complex load of the central office.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a digital pre-distortion filter in an arrangement with a data access arrangement (DAA) on the component side (e.g., in a modem chipset) which allows pre-distortion of a transmitted signal without interfering with digital processes such as emulation of a central office impedance. By placing the pre-distortion filter outside of the DAA, the transmitted signal can be pre-distorted without affecting, e.g., digital emulation of the central office impedance. In this way, the dynamic range of the transmitted signal can be flattened with a simple pre-distortion to achieve the desired minimum return loss.

Placement of a pre-distortion filter in the conventional location within a DAA (e.g., within an analog-to-digital (A/D)/digital-to-analog (D/A) loop of the DAA) affects the frequency distortion of the transmitted signal as desired. However, this placement of a pre-distortion filter causes a change in the complex load of the device, detrimentally affecting digital processes such as digital emulation of a complex load of a central office. Theoretically, a pre-distortion filter can be made to work within a DAA, but the mathematics necessary to counterbalance the affects of the pre-distortion on the change in the complex load create a difficult and complicated architecture to overcome.

In accordance with the principles of the present invention, a digital pre-distortion filter is placed outside of an analog-to-digital (A/D) / digital-to-analog (D/A) loop within a digital emulation filter of a DAA to minimize the noise otherwise associated with the use of a pre-distortion filter. This placement of a digital pre-distortion filter in a way which does not affect the complex load emulated by a digital emulation filter simplifies the digital processes, e.g., digital emulation of the impedance, because the pre-distortion does not affect the complex load as in conventional systems.

Figure 1:
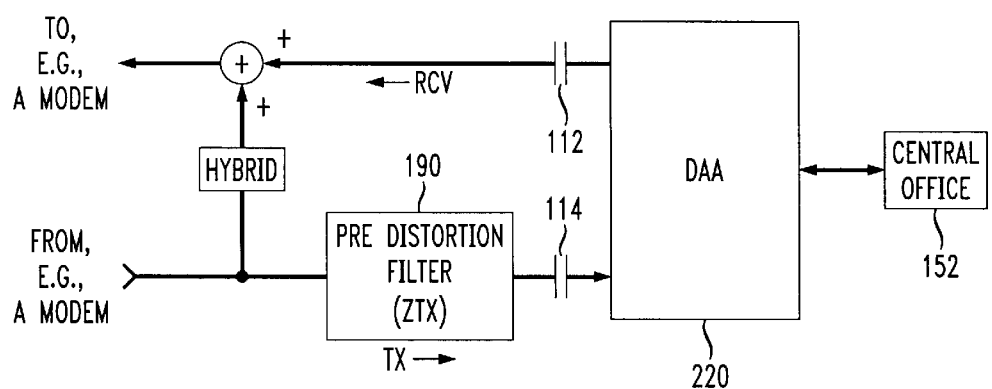
FIG. 1 shows a DAA architecture having a digital pre-distortion filter in a transmit path from a modem or other component serviced by the DAA which emulates a load of the central office, in accordance with the principles of the present invention.

FIG. 1 shows a DAA architecture having a digital pre-distortion filter in a transmit path from a modem or other component serviced by the DAA which emulates a load of the central office, in accordance with the principles of the present invention.

In particular, in FIG. 1, a DAA 220 isolates customer premises equipment (e.g., a modem chipset) from a telephone line from a central office 152. Note that the pre-distortion filter 190 is shown after the AC coupling represented by a capacitor 114.

Besides minimizing noise in a transmit signal using a pre-distortion filter on the modem side of a DAA as shown in FIG. 1, high data speeds are achievable if the impedance to the central office is closely matched. Thus, an example circuit is disclosed including both a pre-distortion filter as well as an impedance matching circuit.

Figure 2:
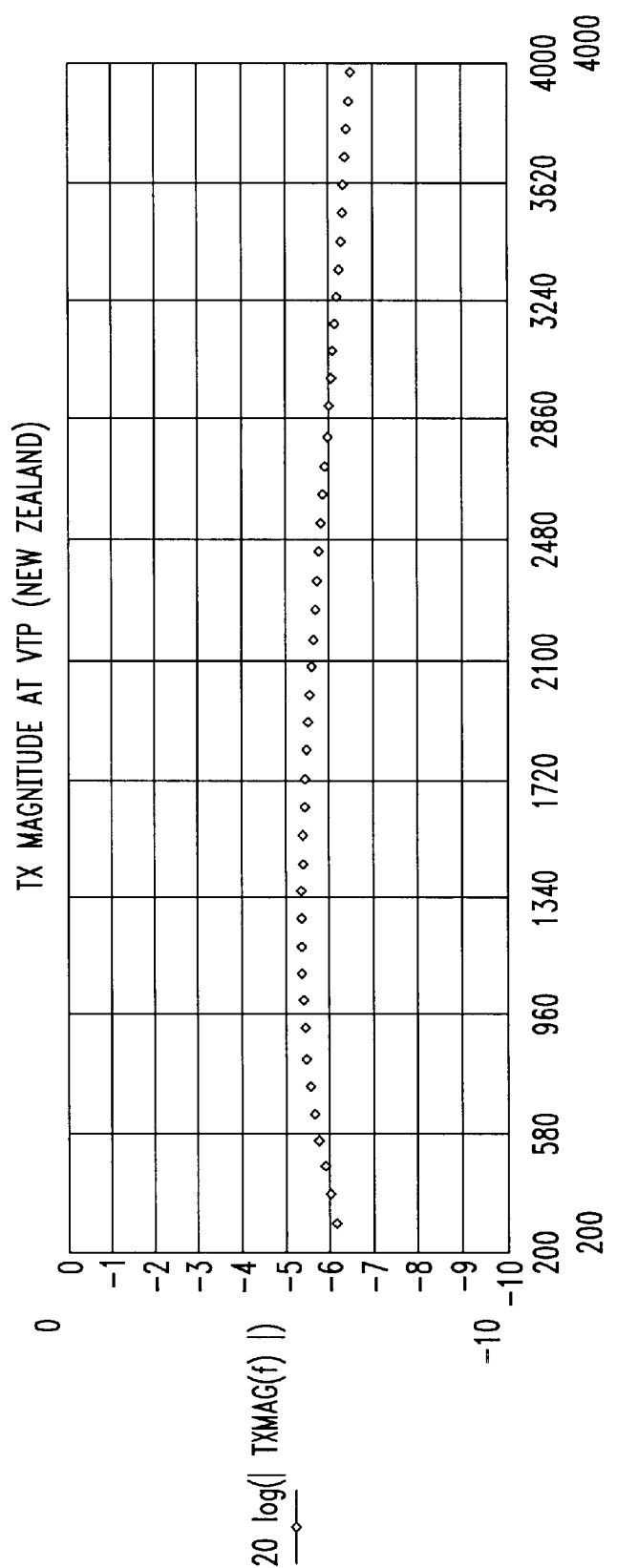
FIG. 2 shows the flatness of an exemplary transmit signal at the TIP end of a DAA including a pre-distortion filter on a modem side of the DAA, in accordance with the principles of the present invention.

FIG. 2 shows the flatness of an exemplary transmit signal at the TIP end of a DAA including a pre-distortion filter on a modem side of the DAA, in accordance with the principles of the present invention.

Figure 3:
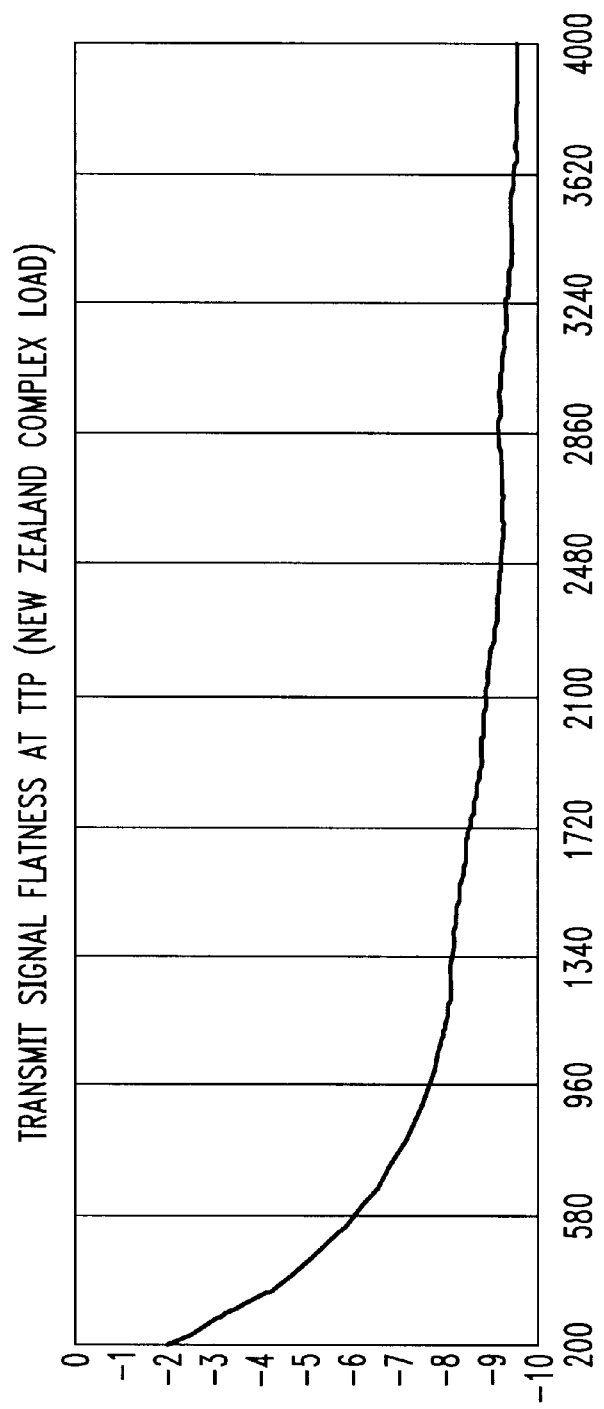
FIG. 3, for comparison to FIG. 2, shows the transmit response without equalization.

In particular, note in FIG. 2 how closely the magnitude of the transmitted signal as measured at the TIP end of the DAA stays to −6 dB, versus FIG. 3, the same circuit without equalization providing a relatively flat transmit signal into a complex load of a central office of a country such as New Zealand.

Figure 4:
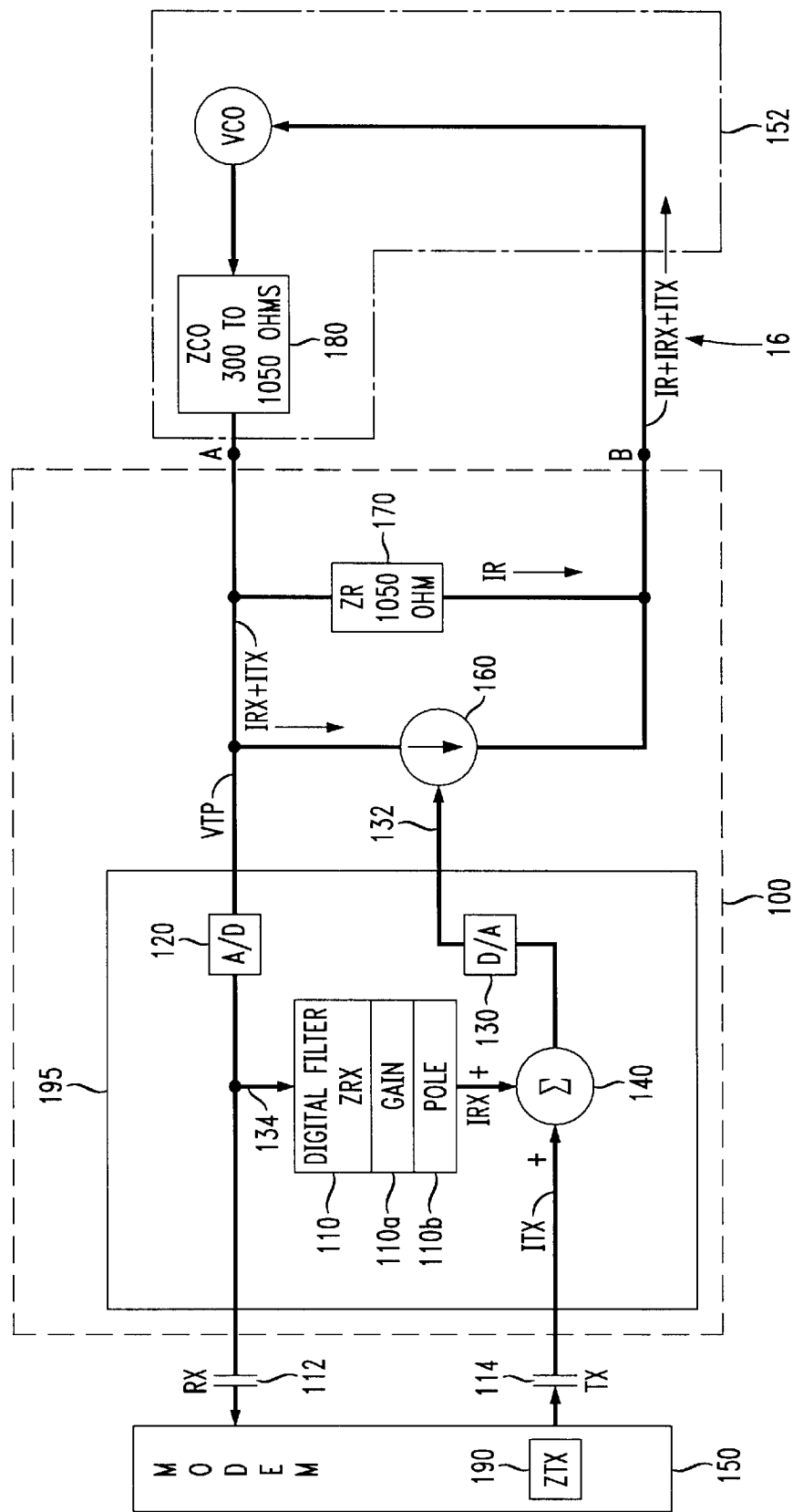
FIG. 4 shows an embodiment of the present invention including a pre-distortion filter in a modem chipset capable of matching the complex load of the central office by emulation, in accordance with the principles of the present invention.

FIG. 4 shows an embodiment of the present invention including a pre-distortion filter in a modem chipset capable of matching the complex load of the central office by emulation, in accordance with the principles of the present invention.

In particular, in FIG. 4, in order to get a flat transmit response at all frequencies of interest, e.g., in-band modem frequencies, the current ITX is preferably the inverse of the frequency shaping of the complex load presented by the central office. A first or second order pre-distortion filter is used in the modem host controller to implement the transfer function HTX.

If the pre-distortion filter is equal to the inverse of the complex load of the central office, i.e., if ZTX =1/ZCO, then in accordance with the principles of the present invention the transmit signal (e.g., the modem transmit signal) will be flat at all frequencies.

In accordance with the principles of the present invention, the transfer function HTX of the pre-distortion filter is calculated as follows:

$$ZTX = \left( \frac{1}{ZCO \times Hsum \times Hda \times Halp \times Hlm} \right)$$

wherein:

Hsum =transfer function of the sigma delta summer 140;

Hda =transfer function of the switched capacitor D/A 130;

Halp =transfer function of an output Low Pass Smoothing Filter (not shown);

Hlm =transfer function of the line modulator (e.g., voltage controlled current source 160:

The transfer function of an exemplary pre-distortion filter 190 is as follows:

$$H_{TX} = \frac{1 - \text{zero} \times z^{-1}}{1 - \text{pole} \times z^{-1}} \times calcgain$$

The zero(es) and pole(s) of the transfer function of the pre-distortion filter 190 can be chosen based on the needs of the particular application. Moreover, the pre-distortion filter 190 may be of any order, e.g., a first order as shown, or a higher order, or may be implemented using FIR filter techniques as well as the above referenced IIR techniques.

In addition to the low-noise capability of the pre-distortion filter 190 on the modem side of the DAA, it is also important to match the impedance in the DAA to the complex load of the central office 152 to maximize the signal to noise ratio of the transmitted signal. Impedance matching in this disclosure refers to image impedance matching. It is desirable to match impedances as required by the various countries so as to maximize return loss to, e.g., greater than 20 decibels (dB).

AC impedance includes reactive elements which cause the frequency components of the transmitted signal to vary. To maximize return loss, the AC termination impedance of a telephone line interface should be the same as the AC termination at the telephone company central office. This is commonly known as an image match. However, as evidenced by numerous standards throughout the world, AC terminations vary between telephone company central offices throughout the world.

In FIG. 3, the DAA 100 includes a programmable digital filter 110, e.g., a sigma delta filter (sometimes alternatively referred to in the art as a delta sigma filter). The sigma delta filter 110 may be, e.g., a first order sigma delta filter having a transfer function which controls a voltage controlled current source 160 to emulate an AC impedance in a given range, e.g., between 300 and 1050 ohms. The sigma delta filter 110 and voltage controlled current source 160 provide repeatable, reliable AC impedance matching with a simple flow diagram.

While the disclosed embodiments relate to the use of a first order sigma delta filter to control the AC impedance, the principles of the present invention relate equally to higher order sigma delta filters, and to single and multi-bit digital filters in general.

The gain and/or pole of the transfer function of the sigma delta first order filter 110 are adjusted to maximize the return loss for the desired AC termination for the requirements of any particular country. In this way, a common DAA 100 can be manufactured and incorporated in products intended for use in any of a variety of countries, and configured under software control to emulate the necessary AC impedance for the central office in the country in which the telephone or modem device is operated.

In more detail, FIG. 4 shows an exemplary signal flow diagram for a telephone line interface 100 including a digital filter, e.g., a first order sigma delta filter 110. Included with the digital filter 110 on an integrated circuit 195 (such as that forming a digital signal processor (DSP)) may be, e.g., an analog-to-digital (A/D) converter 120, a digital-to-analog (D/A) converter 130, and a digital signal summer 140.

A voltage controlled current source 160 is controlled by a signal 132 comprised both of the desired transmitted signal ITX output from, e.g., a modem 150, but also with an AC impedance emulation control signal IRX output from the digital filter 110. In the example circuit of FIG. 3, the digital filter 110 provides the AC impedance emulation control signal IRX based on a feedback signal 134 fed back from the central office 152.

The transfer function of the digital filter 110, i.e., the gain 110a and/or the pole 110b of the digital filter 110 can be preset or programmably tuned by a processor, e.g., from the modem 150 or other internal or external device, to provide the desired AC impedance matching emulation.

In the example shown in FIG. 3, the telephone line interface 100 provides an interface between a modem 150 and a telephone line 16 to a central office 152. Of course, those of ordinary skill in the art would appreciate that the principles of the present invention relate equally to the interface of any equipment to a telephone line, e.g., a telephone, a fax machine, etc.

Moreover, the digital filter 110 shown in FIG. 3 preferably controls only AC impedance and not DC resistance.

As shown in the example of FIG. 3, the interface between the integrated circuit 195 and the modem is digital, e.g., using 1-bit sigma delta digital paths 112, 114, which by depiction in FIG. 3 are AC coupled.

The voltage controlled current source 160 may be any suitable device which provides a constant current based on a voltage level applied to a control line thereof. For instance, a transistor with appropriate feedback to monitor the current would be suitable if arranged in a prescribed way to appear as a current source as is known by those of ordinary skill in the art.

The A/D converter 120 and D/A converter 130 are shown in FIG. 3 for explanatory purposes only to show a separation between analog and digital portions with respect to the digital filter 110. In the disclosed embodiment, the A/D 120 and D/A 130 function in their normal capacities to convert signals to and from the device being serviced, e.g., to and from the modem 150. In accordance with the principles of the present invention, the AC impedance emulation control signal IRX is merely impressed or superimposed upon the otherwise conventional transmit signal ITX to provide both a transmit signal component ITX and an AC impedance emulation control component IRX to the voltage controlled current source 160.

In FIG. 3, it is desired that the impedance of the central office be matched by the parallel combination of ZRX and ZR. In this case, VTP will be equal to the ideal condition of VCO/2 for all signals received from the central office 152.

In an alternative embodiment of the invention, the digital filter 110 can match the impedance of the central office 152 without the use of the reference impedance ZR 170.

Impedance emulation using the sigma delta filter 110 is preferred over implementation of impedance matching in a processor such as a digital signal processor in the modem 150 because delays associated with transmission of data to and from the modem 150 make such impedance matching impractical.

To show that the tip voltage VTP is equal to VCO/2 (but for the impressed transmit signal and the impedance of the central office) proving that the present invention indeed does provide a very desirable AC impedance matching, the tip voltage VTP is calculated as follows, wherein:

ZTX is the pre-distortion filter 190.

ZR is the reference impedance, which provides a partial solution to the AC impedance matching. It can be called a "helper impedance" in that it is the impedance on which the current output from the voltage controlled current source 160 acts. The reference impedance ZR allows the tip voltage VTP to be developed and fed back to the digital filter 110, e.g., through the A/D converter 120, forming a closed loop (albeit with positive feedback). The gain can be greater than 1. As the current increases, the voltage decreases on the TIP (i.e., to the central office), resulting in negative feedback. Preferably, the reference impedance ZR will be approximately equal to the highest matching impedance value necessary, but of course can be of a larger value.

ZRX is the resultant AC impedance of the equipment. The emulated AC impedance ZRX is represented in FIG. 1 across points A and B if the central office 152 were removed from the figure.

ZCO is the AC impedance of the central office 152.

VTP is the tip voltage.

VT is the voltage developed due to the current ITX of the transmit signal, e.g., from the modem 150.

VCO is the voltage impressed or produced by the central office 152.

IR is the current through the reference impedance ZR.

IRX is the portion of the tip/ring current produced by the voltage controlled current source 160.

ITX is the portion of the tip/ring current produced by the transmit signal, e.g., output from the modem 150.

ZRX∥ZR=ZCO
ZCO=(ZRX*ZR)/(ZRX+ZR)
ZRX=(ZCO*ZR)/(ZR−ZCO)
ZRX=1/(1/ZR−1/ZCO)
IRX=VTP/ZRX
IR=VTP/ZR
Solving for VTP:
VTP=VCO−(IRX+ITX+IR)*ZCO
VTP=VCO −(VTP(1/ZCO−1/ZR)*ZCO+ITX*ZCO+VT/ZR*ZCO)+VCO
VTP=(VCO−ITX*ZCO)/2

This last equation, accordingly, shows that the tip voltage VTP indeed does provide the ideal condition of VCO/2, with only the transmit signal current ITX and impedance ZCO (divided by 2) of the central office 152 remaining in the equation.

In accordance with the principles of the present invention, the first order sigma delta filter 110 has a programmable gain 110a and a programmable pole 110b. The programmable gain 110a and/or the programmable pole 110b are used to affect the AC impedance to the telephone line, and therefore implement the AC impedance ZRX.

All functions should be taken into account when determining the values for the particular digital filter to provide the desired overall impedance ZRX. For instance, as shown below in the exemplary transfer functions of the first order sigma delta filter 110, the AC impedance ZRX is provided taking into account the separate transfer functions of a number of different aspects of an exemplary digital filter. Of course, the particular transfer functions to take into account to provide an overall AC impedance in given a particular application will vary, in accordance with the principles of the present invention.

$$ZRX = \left(\frac{1}{Haaf * Had * Hrx * Hsum * Hda * Halp * Hlm}\right)$$

wherein, in the given disclosed example:

Haaf=The anti alias filter.
Had=The switched capacitor A/D.
Hrx=Impedance Emulation Filter RX.
Hsum=Sigma Delta Summer
Had=Switched Capacitor D/A
Halp=Low Pass Smoothing Filter
Hlm=Line Modulator (Voltage Controlled Current Souce)

The transfer function of the impedance emulation digital filter 110 in the z domain is calculated as follows:

$$Hrx = \frac{1 - \text{zero} * z^{-1}}{1 - \text{pole} \times z^{-1}} * calcgain$$

The only variable in the equation for ZRX is Hrx, which is the first order sigma delta filter 110. An additional preference for Hrx is that the transfer function has a loss of at least, e.g., 20 dB at DC to provide AC only impedance matching, leaving DC resistance calculation to be computed elsewhere.

To assure that Hrx has loss at DC, the filter zero is set at 1 (on the unit circle). This leaves the only variables in the impedance matching of ZCO as the pole and gain of Hrx. For instance, to provide 300 ohm AC impedance matching, the gain is made equal to calcgain×300.

While the present invention has been described with reference to telephony, the applications are quite broader. In particular, the present invention is applicable for any circuit requiring AC impedance matching;

While the invention has been described with reference to the exemplary embodiments thereof, those skilled in the art will be able to make various modifications to the described embodiments of the invention without departing from the true spirit and scope of the invention.

What is claimed is:

1. An interface for connection between a modem and a telephone line, comprising:
    a data access arrangement adapted for connection to a telephone line, said data access arrangement emulating a destination load; and
    a digital pre-distortion filter distinct from said data access arrangement in a transmit path in communication with a modem side of said data access arrangement.

2. The interface for connection between a modem and a telephone line according to claim 1, wherein:
    said digital pre-distortion filter is comprised within a modem on said modem side of said data access arrangement.

3. The interface for connection between a modem and a telephone line in accordance with claim 1, further comprising:
    a digital hybrid in communication with a modem side of said digital pre-distortion filter.

4. The interface for connection between a modem and a telephone line in accordance with claim 1, further comprising:
    AC coupling between said digital pre-distortion filter and said data access arrangement.

5. The interface for connection between a modem and a telephone line in accordance with claim 1, further comprising:
    a modem chipset including said digital pre-distortion filter.

6. The interface for connection between a modem and a telephone line in accordance with claim 1, wherein:
    said digital pre-distortion filter is formed by a sigma delta filter.

7. The interface for connection between a modem and a telephone line in accordance with claim 6, wherein:
    said sigma delta filter is a first order sigma delta filter.

8. The interface for connection between a modem and a telephone line in accordance with claim 1, wherein:

said data access arrangement is adapted to emulate an impedance of a central office connected to a telephone line side of said data access arrangement.

9. The interface for connection between a modem and a telephone line in accordance with claim 3, wherein said digital hybrid comprises:

a digital filter.

10. The interface for connection between a modem and a telephone line in accordance with claim 9, wherein said digital filter comprises:

a sigma delta filter.

11. The interface for connection between a modem and a telephone line in accordance with claim 10, wherein:

said sigma delta filter of said digital hybrid is a first order sigma delta filter.

12. A method of flattening a dynamic range of a transmit signal through a data access arrangement, comprising:

pre-distorting a transmit signal;

presenting said pre-distorted transmit signal to a distinct data access arrangement emulating an impedance of a complex load of a central office; and transmitting said pre-distorted transmit signal to said central office together with a signal representing said emulated impedance of a complex load of said central office.

13. The method of flattening a dynamic range of a transmit signal through a data access arrangement according to claim 12, further comprising:

receiving an inverted representation of said transmit signal.

14. The method of flattening a dynamic range of a transmit signal through a data access arrangement in accordance with claim 12, wherein:

said step of pre-distorting is performed in a digital filter.

15. The method of flattening a dynamic range of a transmit signal through a data access arrangement in accordance with claim 14, wherein:

said digital filter is a sigma delta filter.

16. The method of flattening a dynamic range of a transmit signal through a data access arrangement in accordance with claim 15, wherein:

said sigma delta filter is a first order sigma delta filter.

17. Apparatus for flattening a dynamic range of a transmit signal through a data access arrangement, comprising:

means for pre-distorting said transmit signal;

means for presenting said pre-distorted transmit signal to a distinct data access arrangement emulating an impedance of a complex load of a central office; and means for transmitting said pre-distorted transmit signal to said central office together with a signal representing said emulated impedance of a complex load of said central office.

18. The apparatus for flattening a dynamic range of a transmit signal through a data access arrangement in accordance with claim 17, wherein said means for pre-distorting comprises:

a digital filter.

19. The apparatus for flattening a dynamic range of a transmit signal through a data access arrangement in accordance with claim 18, wherein:

said digital filter is a sigma delta filter.

20. The apparatus for flattening a dynamic range of a transmit signal through a data access arrangement in accordance with claim 19, wherein:

said sigma delta filter is a first order sigma delta filter.

* * * * *